US010466338B2

(12) United States Patent
Al-Mufti et al.

(10) Patent No.: US 10,466,338 B2
(45) Date of Patent: Nov. 5, 2019

(54) DETECTING FEDERAL INCUMBENT RADAR (FIR) SIGNAL

(71) Applicant: CommScope Technologies LLC, Hickory, NC (US)

(72) Inventors: Khalid W. Al-Mufti, Sterling, VA (US); Ariful Hannan, Sterling, VA (US); Thomas B. Gravely, Herndon, VA (US); Navin Srinivasan, Fairfax, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/610,037

(22) Filed: May 31, 2017

(65) Prior Publication Data

US 2018/0017663 A1   Jan. 18, 2018

Related U.S. Application Data

(60) Provisional application No. 62/459,195, filed on Feb. 15, 2017, provisional application No. 62/363,307, filed on Jul. 17, 2016.

(51) Int. Cl.
  *G01S 7/00* (2006.01)
  *G01S 7/02* (2006.01)
  (Continued)

(52) U.S. Cl.
  CPC .............. *G01S 7/021* (2013.01); *H04B 1/06* (2013.01); *H04B 1/69* (2013.01); *H04B 17/30* (2015.01);
  (Continued)

(58) Field of Classification Search
  CPC .. H04B 17/30; H04B 1/69; H04B 1/06; G01S 7/021
  See application file for complete search history.

(56) References Cited

U.S. PATENT DOCUMENTS

| 4,910,468 A | * | 3/1990 | Ohtsuka | H04B 7/002 329/316 |
| 4,914,676 A | * | 4/1990 | Iwamatsu | H04B 7/002 375/349 |

(Continued)

OTHER PUBLICATIONS

Diniz, "Adaptive Filtering Algorithms and Practical Implementation", 2013, pp. 79-81, Publisher: Springer Science + Business Media New York.

(Continued)

*Primary Examiner* — Jean B Corrielus
(74) *Attorney, Agent, or Firm* — Fogg & Powers LLC

(57) ABSTRACT

A method for detecting the presence of a signal in a frequency spectrum is provided. The method includes receiving the frequency spectrum. The power spectral density of the received frequency spectrum is estimated. A plurality of frequency bins are segmented for the frequency spectrum based on the estimated power spectral density. For segments with an estimated power spectral density above a first threshold, a radar spectral signature matching algorithm is applied to detect the presence of the signal and for segments with a power estimate below the first threshold and above a second threshold, additional techniques are applied to detect the presence of the signal.

23 Claims, 7 Drawing Sheets

(51) Int. Cl.
*H04B 1/69* (2011.01)
*H04B 1/06* (2006.01)
*H04B 17/30* (2015.01)
*H04B 17/318* (2015.01)
*H04J 11/00* (2006.01)

(52) U.S. Cl.
CPC ........ H04B 17/318 (2015.01); *H04J 11/0023* (2013.01)

(56) References Cited

U.S. PATENT DOCUMENTS

| | | | | |
|---|---|---|---|---|
| 5,241,320 | A * | 8/1993 | Mizoguchi | H04B 7/002 342/362 |
| 5,383,224 | A * | 1/1995 | Mizoguchi | H04B 1/126 370/201 |
| 9,057,772 | B1 * | 6/2015 | Chavez | G01S 5/0215 |
| 2003/0107512 | A1 * | 6/2003 | McFarland | G01S 7/021 342/159 |
| 2003/0162539 | A1 * | 8/2003 | Fiut | H04W 24/00 455/424 |
| 2004/0042569 | A1 * | 3/2004 | Casabona | H04B 7/18513 375/346 |
| 2006/0066290 | A1 * | 3/2006 | Hausdorf | G01R 23/165 324/76.27 |
| 2007/0014343 | A1 * | 1/2007 | Horneman | H04L 25/0262 375/225 |
| 2010/0224762 | A1 * | 9/2010 | Hauske | G01V 8/12 250/214 C |
| 2011/0131260 | A1 * | 6/2011 | Mody | H04L 27/0006 708/5 |
| 2013/0314267 | A1 * | 11/2013 | Kenney | G01S 7/021 342/21 |
| 2014/0237259 | A1 * | 8/2014 | Karabinis | H04L 9/00 713/189 |
| 2015/0233991 | A1 * | 8/2015 | Miar | G01R 29/26 702/191 |

OTHER PUBLICATIONS

Gardner, "Exploitation of Spectral Redundancy in Cyclostationary Signals", Apr. 1991, pp. 14-36, Publisher: IEEE SP Magazine.

Smith et al., "Handbook of Real-Time Fast Fourier Transforms Algorithms to Product Testing", 1995, pp. 425-427, Publisher: IEEE Press.

* cited by examiner

DETECTING FEDERAL INCUMBENT RADAR (FIR) SIGNAL

CROSS-REFERENCE TO RELATED APPLICATIONS

This application claims priority to U.S. Provisional Application Ser. No. 62/363,307, same title herewith, filed on Jul. 17, 2016, and U.S. Provisional Application Ser. No. 62/459,195, same title herewith, filed on Feb. 15, 2017, which are both incorporated in there entirety herein by reference.

TECHNICAL FIELD

Embodiments of the invention are directed to detecting the presence of signals in a frequency range.

BACKGROUND OF THE INVENTION

With the growth in wireless communications, the Federal Communication Commission has recently adopted rules to allow commercial shared use of 150 MHz of the 3.5 GHz band. Traditionally, this spectrum has been reserved for various Federal incumbent services, e.g., Department of Defense and fixed satellite services. Due to the nature of the Federal Incumbent services, much of this spectrum goes unused a large part of the time.

Under the new rules, the spectrum will be shared between the incumbent Federal services, and licensed and unlicensed users. The licensed and unlicensed users will not be allowed to interfere with the use of the spectrum by the Federal incumbent services. Under this paradigm, the licensed and unlicensed users must provide specified levels of protection from interference to Federal incumbent users. To this end, it is desirable to develop a technique to detect signals from Federal Incumbent users so that protection can be provided from interference.

SUMMARY

The following summary is made by way of example and not by way of limitation. It is merely provided to aid the reader in understanding some of the aspects of the invention. Embodiments provide systems and methods of dealing with different communication systems using shared frequency bands.

In one embodiment, a method for detecting the presence of a signal in a frequency spectrum is provided. The method includes receiving the frequency spectrum. A power spectral density of the received frequency spectrum is estimated. A plurality of frequency bins are segmented for the frequency spectrum based on the estimated power spectral density. For segments with an estimated power spectral density above a first threshold, a radar spectral signal matching algorithm is applied to detect the presence of the signal and for segments with a power estimate below the first threshold and above a second threshold, additional techniques are applied to detect the presence of the signal.

In another embodiment, a system for detecting the presence of a signal in a frequency spectrum is provided. The system includes an environmental sensing capability (ESC) sensor and an ESC core. The ESC sensor is configured to receive the frequency spectrum and convert the spectrum into a digital data stream for transport. The ESC core is coupled to the ESC sensor over an encrypted backhaul communication link. The ESC core detects the presence of the signal in the frequency spectrum by: estimating the power spectral density of the received frequency spectrum; segmenting a plurality of frequency bins for the frequency spectrum based on the estimated power spectral density; for segments with an estimated power spectral density above a first threshold, applying a radar spectral signal matching algorithm to detect the presence of the signal; and for segments with a power estimate below the first threshold and above a second threshold, applying additional techniques to detect the presence of the signal.

In another embodiment, a system for detecting the presence of a signal in a frequency spectrum is provided. The system includes an environmental sensing capability (ESC) sensor and an ESC core. The ESC sensor is configured to receive the frequency spectrum and convert the spectrum into a digital data stream for transport. The ESC core is coupled to the ESC sensor. The ESC core detects the presence of the signal in the frequency spectrum by: estimating the power spectral density of the received frequency spectrum; segmenting a plurality of frequency bins for the frequency spectrum based on the estimated power spectral density; for segments with an estimated power spectral density above a first threshold, applying a radar spectral signal matching algorithm to detect the presence of the signal; and for segments with a power estimate below the first threshold and above a second threshold, applying additional techniques to detect the presence of the signal. An output of the ESC core is configured to provide an indication of the presence of the signal in the spectrum to a spectrum access system (SAS) over a communication link.

In another embodiment, a system for detecting the presence of a signal in a frequency spectrum in an embodiment is provided. The system includes an environmental sensing capability (ESC) sensor and an ESC core. The ESC sensor is configured to receive the frequency spectrum and convert the spectrum into a digital data stream for transport. The ESC sensor is configured to estimate the power spectral density of the received frequency spectrum and segment a plurality of frequency bins for the frequency spectrum based on the estimated power spectral density to identify segments that may contain the signal. The ESC core is coupled to the ESC sensor over an encrypted backhaul communication link to receive the identified segments from the ESC sensor. the ESC core detects the presence of the signal in the frequency spectrum by: for segments with an estimated power spectral density above a first threshold, applying a radar spectral signal matching algorithm to detect the presence of the signal; and for segments with a power estimate below the first threshold and above a second threshold, applying additional techniques to detect the presence of the signal.

In another embodiment, a system for detecting the presence of a signal in a frequency spectrum, the system includes an environmental sensing capability (ESC) sensor, a signal detector and an ESC core. The ESC sensor includes a main signal path, a signal correction path and a subtractor. The main signal path includes at least a main analog to digital converter to convert main communication analog signals from a first communication system into main communication digital signals. The signal correction path is coupled to receive a sample of second communication analog signals transmitted from a second communication system. The signal correction path includes at least a correction analog to digital converter to convert the sample of second communication analog signals to correction digital signals. The subtractor is communicatively coupled to subtract the correction digital signals from the main communication digital signals. The signal detector is coupled to an output of the subtractor and is configured to determine the presence of signals from the first communication system. The ESC core is communicatively coupled to the signal detector. The ESC core has signal processing functions and is configured to provide an output to a spectrum analysis system.

In another embodiment, a method of processing first communication signals of a first communication system that is at least partially collocated with at least a part of second communication system is provided. The method includes coupling received first communication signals of the first communication system to a main signal path. Second sample communication signals generated by the second communication system are coupled to a signal correction path. The second sample communication signals in the signal correction path is subtracted from the first communication signals in the main signal path. A signal detection algorithm is applied to the output of the subtracting of the second sample communication signals from the first communication signals to at least in part determine the presence of a first communication signal.

In another embodiment, a system for detecting the presence of a signal in a frequency spectrum is provided. The system includes an environmental sensing capability (ESC) sensor and an ESC core. The ESC sensor has signal processing functions and is configured to provide an output to a spectrum analysis system. The ESC sensor includes a main signal path, a signal correction path, a subtractor and a signal detector. The main signal path includes at least a main analog to digital converter to convert main communication analog signals from a first communication system into main communication digital signals. The signal correction path is coupled to receive a sample of second communication analog signals transmitted from a second communication system. The signal correction path includes at least a correction analog to digital converter to convert the sample of the second communication analog signals to correction digital signals. The subtractor is communicatively coupled to subtract the correction digital signals from the main communication digital signals. The signal detector is coupled to an output of the subtractor and is configured to determine the presence of signals from the first communication system. In addition, the ESC core is communicatively coupled to the signal detector.

It should be understood that the appended drawings are not necessarily to scale, presenting a somewhat simplified representation of various preferred features illustrative of the basic principles of embodiments of the invention. The specific design features of the system and/or sequence of operations as disclosed herein, including, for example, specific dimensions, orientations, locations, and shapes of various illustrated components, will be determined in part by the particular intended application and use environment. Certain features of the illustrated embodiments may have been enlarged, distorted or otherwise rendered differently relative to others to facilitate visualization and clear understanding.

DETAILED DESCRIPTION

Figure 1:
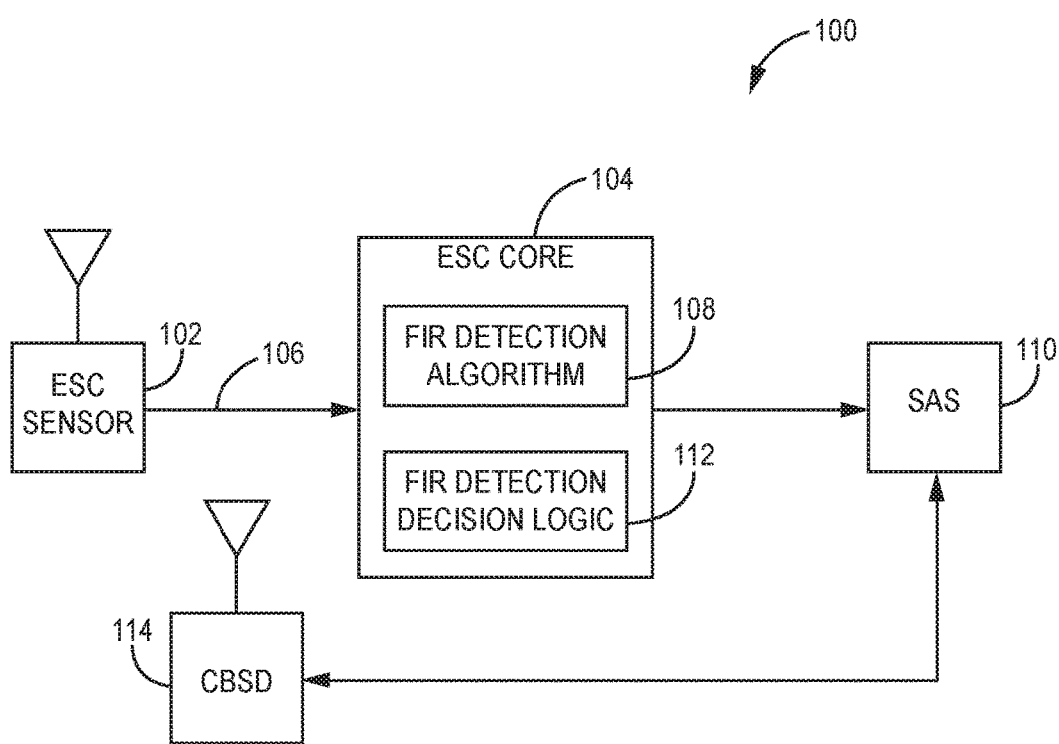
FIG. 1 is a block diagram of an environmental sensing capability (ESC) system for implementing an embodiment of the present invention.

FIG. 1 is a high level functional block diagram of an Environmental Sensing Capability (ESC) system, indicated generally at 100, to detect signals in a shared spectrum. The focus of this specification shall be on three elements of the ESC system 100; namely, ESC RF Sensor 102, ESC Core 104 and encrypted backhaul 106. The ESC RF sensor 102 is responsible for monitoring 3550-3700 MHz Federal Incumbent Radar (FIR) signals and sending the encrypted raw RF signal IQ data back to the ESC core 104 over encrypted backhaul 106 for analysis. The data is segmented by the ESC sensor 102 into time-frequency (T-F) blocks with 20 MHz bandwidth and a predefined time duration, which may be a function of the expected duration of the received radar pulse. The ESC core 104 includes a processor and data storage (memory). The ESC core 104 includes a FIR signal detection algorithm 108 that is stored in the data storage and run on the processor to decrypt the data and analyze the data, block by block. Depending on the output of the FIR detection algorithm 108, the FIR Detection Decision Logic 112, which runs on the processor of ESC core 104, will inform the Spectrum Access System (SAS) 110 of any detected FIR channels and the corresponding ESC sensor ID. In other embodiments of the ESC system 100, part, or the whole, of the FIR signal detection processing can take place in the ESC sensor 102 as shown in FIG. 1A.

Figure 1A:
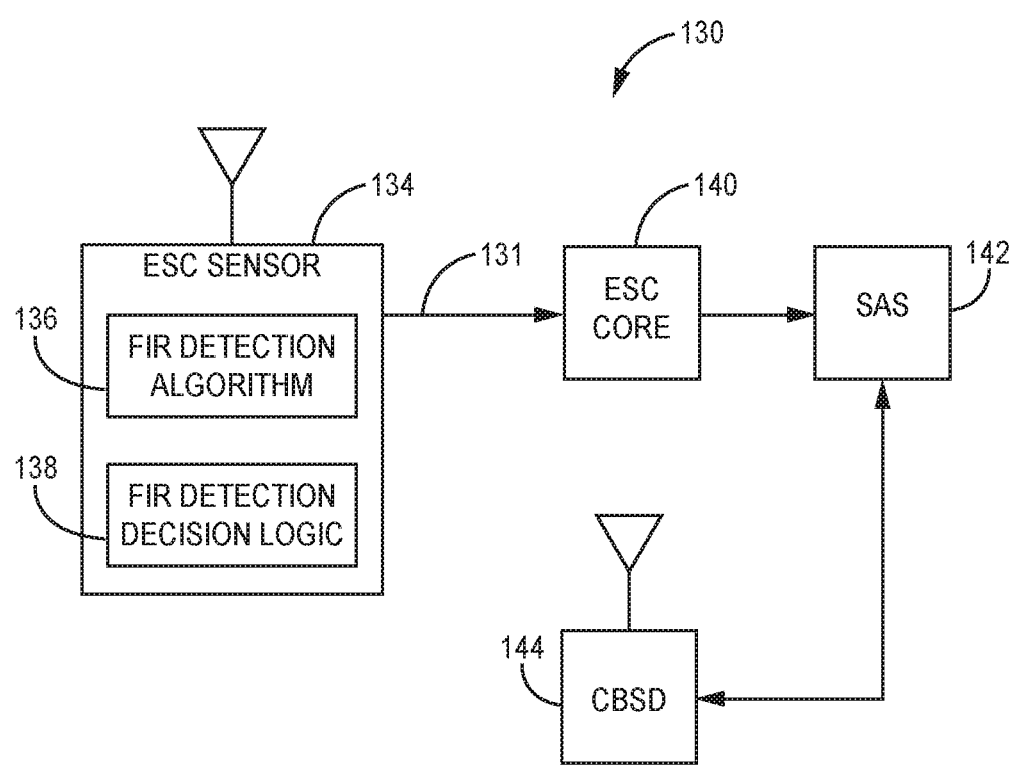
FIG. 1A is a block diagram of an ESC system for implementing another embodiment of the present invention.

As illustrated in FIG. 1A, in this embodiment, a FIR detection algorithm 136 and a FIR detection decision logic 138 is received within an ESC Sensor 134. The ESC sensor 134 includes a processor and data storage (memory). As with the embodiment of FIG. 1, the ESC sensor 134 is responsible for monitoring 3550-3700 MHz Federal Incumbent Radar (FIR) signals and sending the encrypted raw RF signal IQ data to the ESC core 140 over encrypted backhaul 131 for analysis. In an embodiment, the data is segmented by the ESC sensor 134 into time-frequency (T-F) blocks with 20 MHz bandwidth and a predefined time duration, which may be a function of the expected duration of the received radar pulse. The ESC sensor 134, in this embodiment, includes a FIR signal detection algorithm 138 that is stored in the data storage of the ESC sensor 134 and run on the processor of the ESC sensor 134 to decrypt the data and analyze the data, block by block. Depending on the output of the FIR detection algorithm 136, the FIR Detection Decision Logic 138, which runs on the processor of ESC sensor 134, will inform the Spectrum Access System (SAS) 142 of any detected FIR channels and the corresponding ESC sensor ID.

Figure 4:
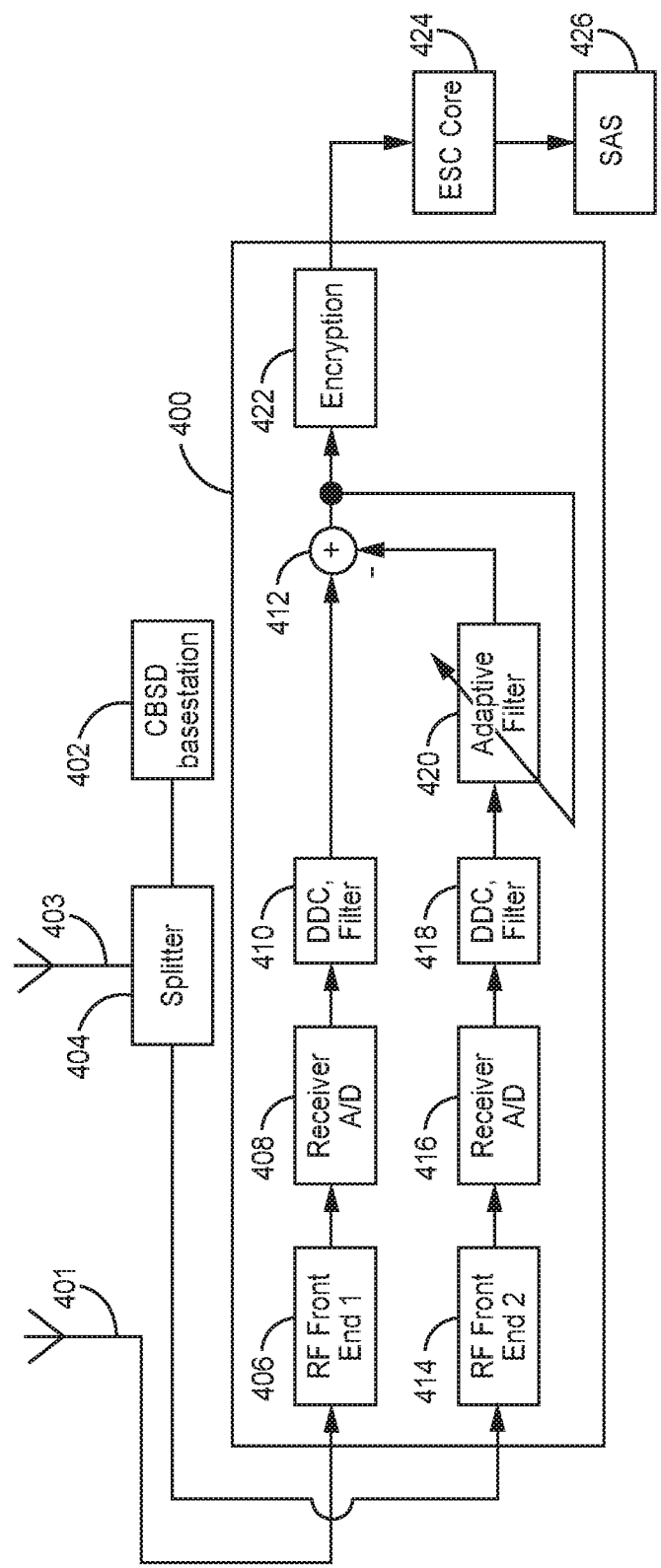
FIG. 4 is a block diagram of an embodiment of an environmental sensing capability (ESC) system for use in detecting signal consistent with an embodiment of the present invention.

In the event that a Citizen Band Service Device (CBSD) node 114 of the embodiment of FIG. 1 and/or the CBSD node 144 of embodiment FIG. 1A, is collocated with an ESC sensor 102 and/or ESC Sensor 134, thus potentially masking the received Federal incumbent activity, ESC system 100 and/or ESC system 130 can take steps in order to mitigate interference from collocated CBSD 114 and/or CBSD 144 as described in more detail below with respect to FIG. 4. To further improve the ability of the ESC system 100 and/or ESC system 130 to identify FIR signals, a multitude of advanced signal processing techniques is used in the ESC core 104 and/or ESC core 140.

Figure 2:
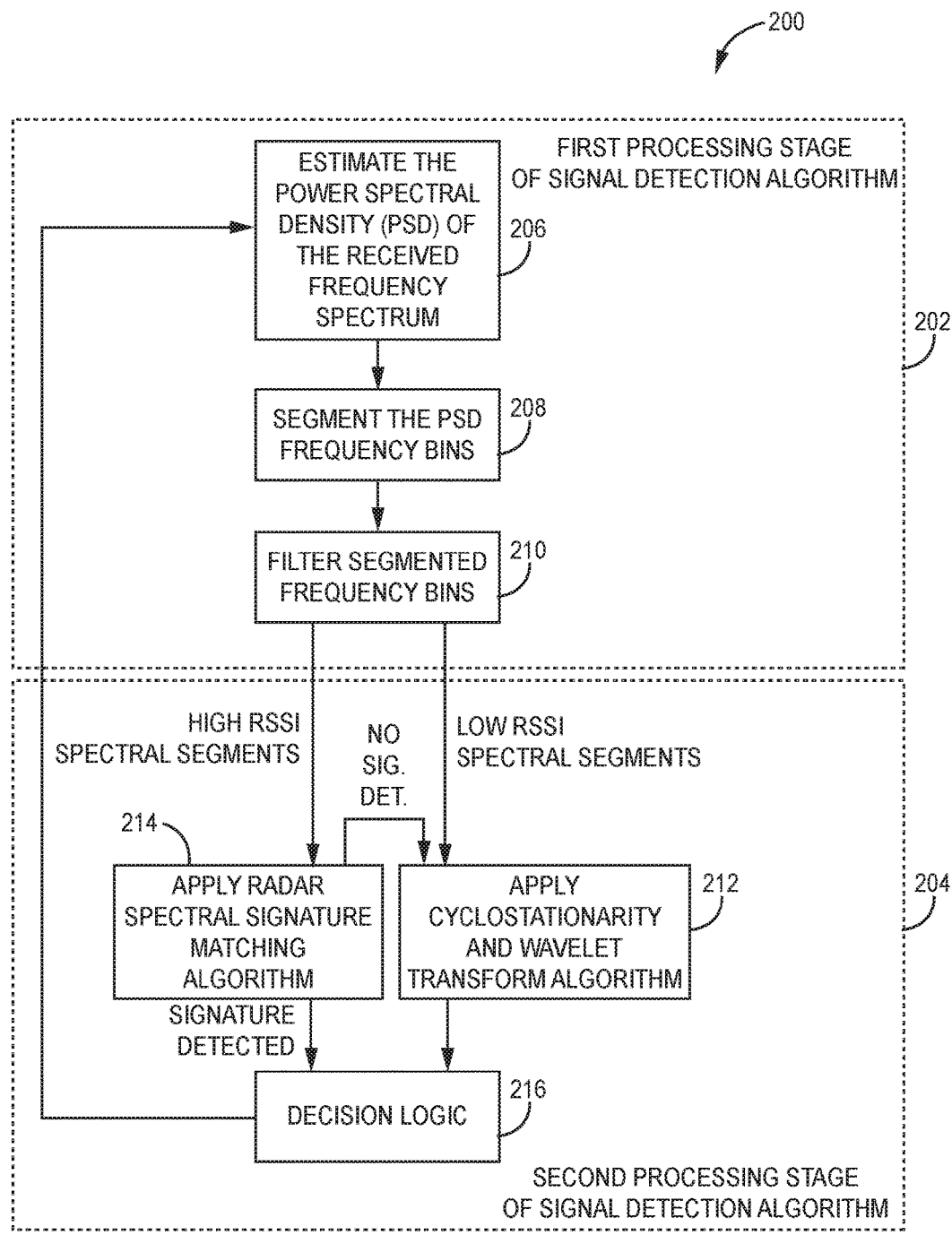
FIG. 2 is a flow chart of a process for detecting a signal, e.g., a Federal Incumbent Radar (FIR) signal consistent with an embodiment of the invention.

At a high level, as shown in FIG. 2, one embodiment of the FIR detection algorithm 108 of FIG. 1 includes first and second processing stages of signal detection 202 and 204. The advantage of a two stage processing method is that processing time is statistically minimized by applying higher computational load algorithms based on energy and spectral characteristics. In the first processing stage 202, an estimate of the received signal power spectral density (PSD) is computed at block 206 from an averaged modified periodigram of the received T-F block samples, see Smith, W. W. (1995). Handbook of real-time fast Fourier transforms: algorithms to product testing. New York: IEEE Press. At block 208, the PSD frequency bins are segmented into three segments: high RSSI, which are bins with power exceeding threshold high (TH), low RSSI region, which are bins with power exceeding threshold low (TL) but below TH, and a rejection region, which are bins with power below TL. The TL is the thermal noise power of the receiver of ESC sensor 102. Only high and low RSSI segments are processed by second processing stage 204, while segments in the rejection stage are ignored. A filtering stage further prunes segments with contiguous bandwidth less than bandwidth minimum (BWMIN) corresponding to pulse width of Radar signal, e.g. 0.9 MHz, at block 210. The output of this filtering stage is the input to the second processing stage 204, which consists of two types of processing that can be applied based on the classification of the respective segments. The high RSSI segments are processed by the Radar Spectral Signature Matching algorithm, which detects spectral segments matching the 3 dB power bandwidth of a Radar pulse, at block 214. If a match is detected, then block 214 sets the Radar Signature Match flag to 1, which is passed to the Decision Logic block 216. If no Radar spectral signature was found, then high RSSI spectral segment data is passed as input to block 212, where it will be processed by the Cyclostationary and Wavelet algorithms.

The low RSSI segments are processed by the Cyclostationarity detection algorithm at block 212, where a search is conducted for cyclic frequency corresponding to the Radar transmission characteristics. A wavelet transform will be also performed on the selected segment to search for transient radar pulses where it may not be visible in power spectral analysis at block 212. The method concludes at block 216 where decision logic is used to identify signals that have been detected by the process.

Figure 3:
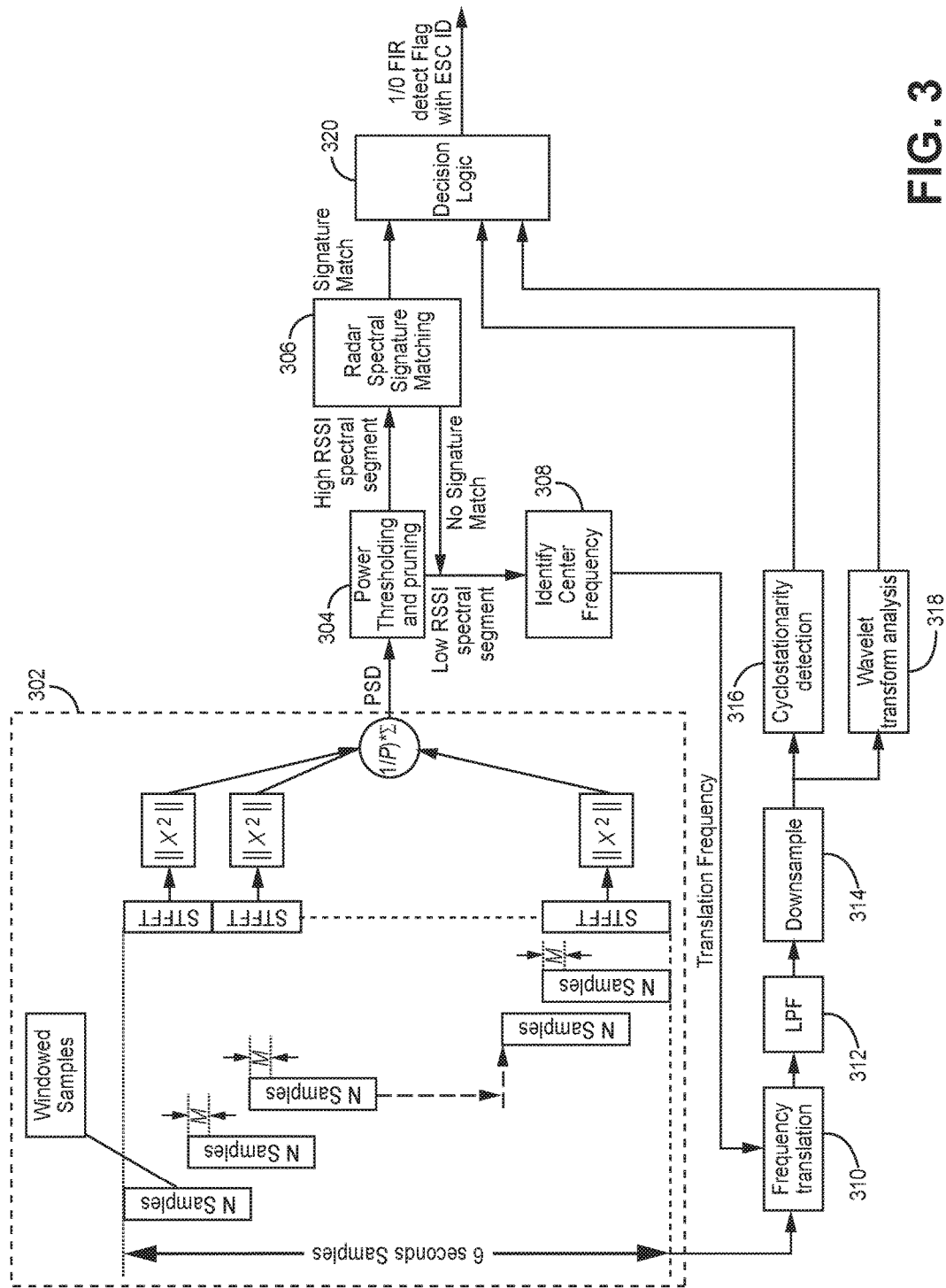
FIG. 3 is a further flow diagram of a process for detecting a signal consistent with another embodiment of the invention.

FIG. 3 depicts another embodiment of the FIR detection algorithm 108 of FIG. 1:

Primary Processing:

The process begins with Computing the power spectral density (PSD) of predefined number, which can be a function of the expected duration of the received Radar pulse, of input IQ data samples, x, by computing the average of a sequence of P Modified Period grams given by:

$$PSD_P(k) = \frac{1}{P} * \sum_{p=1}^{P} I_p(k)$$

Wherein P=number of sample blocks averaged and $I_p(k)$ is the kth value of the Pth modified periodigarm defined as:

$$I_p(k)\left[\frac{1}{U}\right] * |A_p(k)|^2,$$

where U is the sum of the windowing function, WF(n), defined as U $$= \sum_{n=0}^{N-1} [WF(n)],$$

and
$A_p(k)$ is the N-point FFT of the windowd data defined as:

$$A_p(k) = \sum_{n=0}^{N-1} WF(n) * x[n + (p-1)(N-M+1)] * W_N^{k*n} \text{ where,}$$

$$W_N^{kn} = \cos\left(\frac{2\pi kn}{N}\right) - j*\sin\left(\frac{2\pi kn}{N}\right),$$

k=0, 1, ... N−1, and p=1 ... P, where P is the number of N-point FFTs

This is represented graphically at 302. At block 304, the process proceeds with applying power thresholds and pruning. In one embodiment, this includes:
(1.1) Identify contiguous segments of minimum length L, or more, of frequency bins that exceed a power threshold, $T_H$.
1.2) Identify contiguous segments of minimum length L, or more, of frequency bins that are below a power threshold, $T_H$, but are above power threshold $T_L$.
(1.3) For contiguous segments identified in (1.1), perform Radar pulse 3 dB power bandwidth spectral signature matching (at block 306).
(1.4) If spectral match is detected (1.3), then set FIR detected flag to true and compute the FIR channel by translating the relative maxima bin number to the corresponding passband frequency in the 3.5 GHz band.
(1.5) If no signature is found, then pass the spectral segment to block 308.
(1.6) For contiguous segments identified in (1.2), start secondary processing.

Secondary Processing:

The secondary processing is applied to low RSSI spectral segments and begins at block 308. In one embodiment, this secondary processing includes:
(2.1) Identify the center frequency of the low RSSI spectral segment(s) from step (1.2) (block 308) and pass the center frequency to frequency translation module.
(2.2) At block 310, translate the predefined number of input IQ data samples by the translation frequency determined at block 308.
(2.3) Filter output of frequency translator with a low pass filter at block 312.
(2.4) Down sample the filter output by a factor of D, where 4≤D≤10 at block 314.

(2.5) Pass resampled signal to Cyclostationarity detection module at block 316, which will search for cyclic frequency corresponding to the Radar transmission characteristics.

(2.6) If a cyclic frequency matching a Radar cyclic frequency is detected at block 316 (2.5), then set FIR detected flag to true and compute the FIR channel by translating the cyclic frequency to the corresponding passband frequency in the 3.5 GHz band.

(2.7) Discrete Wavelet Transformation will be performed on the low RSSI segments at block 318 to identify transient radar pulses. An optimal wavelet filter, most likely in the family of Daubechies, will be applied to detect radar waveforms.

(2.8) If a wavelet decomposition coefficients, after appropriate thresholding, matches the Radar pulse repetition pattern, then set FIR detected flag to true and compute the FIR channel by translating the transform subband frequency to the corresponding passband frequency in the 3.5 GHz band.

Decision Logic:

The process concludes at block 320 by applying decision logic (e.g., FIR Detection Decision Logic 112 of FIG. 1) to produce an output that indicates the presence of any detected Radar signals. In one embodiment, this decision logic includes:

(3.1) If detection flag is not set in primary or secondary processing, then set FIR detection flag to false. The decision logic provides an output with the FIR detection flag (1 or 0) and the ESC ID and passes this information to the SAS, e.g., SAS 110 of FIG. 1.

(3.2) The method then repeats the steps of the primary and secondary processing for the next processing window worth of IQ data samples.

ESC Backhaul

As illustrated in FIG. 1, ESC sensor 102 provides data to ESC core 104 over encrypted backhaul 106. In one embodiment, this data is raw RF signal data from ESC sensor 102 to ESC core 104. Assuming that encrypted raw RF signal IQ data is shipped to ESC core 104 for processing and incumbent detection, then the estimated minimum backhaul rate is determined as follows:

$$escSensorBackhaulRate = \left(\frac{20e6\,samples}{second}\right) * \frac{2\,words}{sample} * \frac{14\,bits}{word} = 560\,e6bps = 560Mbps$$

When two (2) percent overhead for Ethernet is included, then the minimum backhaul rate is 571.2 Mbps. Therefore, a 1 GB Ethernet could provide the backhaul of data from ESC sensor 102 to ESC core 104 with this configuration. These backhaul rates can be compared to fronthaul data rates in LTE networks.

In another embodiment, when the FIR Detection algorithm 108 and FIR detection decision logic 112 operate on the raw IQ data in the ESC sensor 104, the sensor sends only 1/0 flag to indicate incumbent detection. Thus, even with added overhead, e.g. to exchange sensor IDs which are issued by the SAS 110 and known only to the SAS, 1 Mbps backhaul should suffice in this case.

In another embodiment, processing of the received signal for FIR detection is split between the ESC sensor 102 and the ESC core 104. In this scenario, the energy detection takes place in the ESC sensor 102 and only a segment, say 2.5 MHz where an incumbent signal is likely to be detected, is sent to the ESC core 104 (sensor thresholding technique). In such a case, a 100 Mbps backhaul should be sufficient to ship the raw IQ data of interest. However, it should be mentioned here that WINF_15_S-0071-V0.3.0 sets a requirement that restricts in shipping detected time series signals to ESC core.

In another embodiment, compressive sampling, which can ideally reduce backhaul data rate by an order of magnitude, is used. The advantage of compressive sampling is that no detection or thresholding will be required at the ESC core 104. Other methods, such as lossy or lossless compression can be applied to the Raw RF data to reduce the raw backhaul rate by some factor.

Mitigating Collocated CBSD Interference

In some cases, the ESC sensor 400 and CBSD base station 402 are collocated, thus placing the ESC antenna 401 and CBSD antenna 403 in close proximity to each other. For such cases, interference cancellation techniques can be implemented in the ESC sensor 400 in order to prevent the CBSD signal from masking the FIR signal. FIG. 4 illustrates a technique by which the ESC sensor 400 adaptively subtracts from the IQ data that is received by the ESC antenna 401. The adaptive filter 420 can be a Least-Mean Square (LMS) or Recursive Least-Squares based algorithm.

In this embodiment, ESC sensor 400 includes a main signal path that receives signal from antenna 401. This signal path includes RF front end 406, Receiver A/D converter 408, digital down converter (DDC) and filter 410 and subtractor 412. This main path receives, digitizes, down-converts and filters the signals received at antenna 401.

ESC sensor 400 also includes a signal cancellation path that processes a signal from CBSD base station 402 so that any impact of that signal received at antenna 401 can be canceled out of the signal provided to the ESC core 424. This signal path includes RF front end 414, receiver A/D converter 416, DDC and filter 418, and adaptive filter 420. The output of this signal path is fed into the negative port of subtractor 412. Adaptive filter 420 is adjusted based on the output of subtractor 412.

The output of subtractor 412 is the data to be sent to ESC core 424 for processing to detect the presence of signals from incumbent systems as described in detail above. The output of the processing at ESC core 424 is sent to the SAS 426 for use in allocating bandwidth so as to not interfere with the incumbent services.

Figure 5:
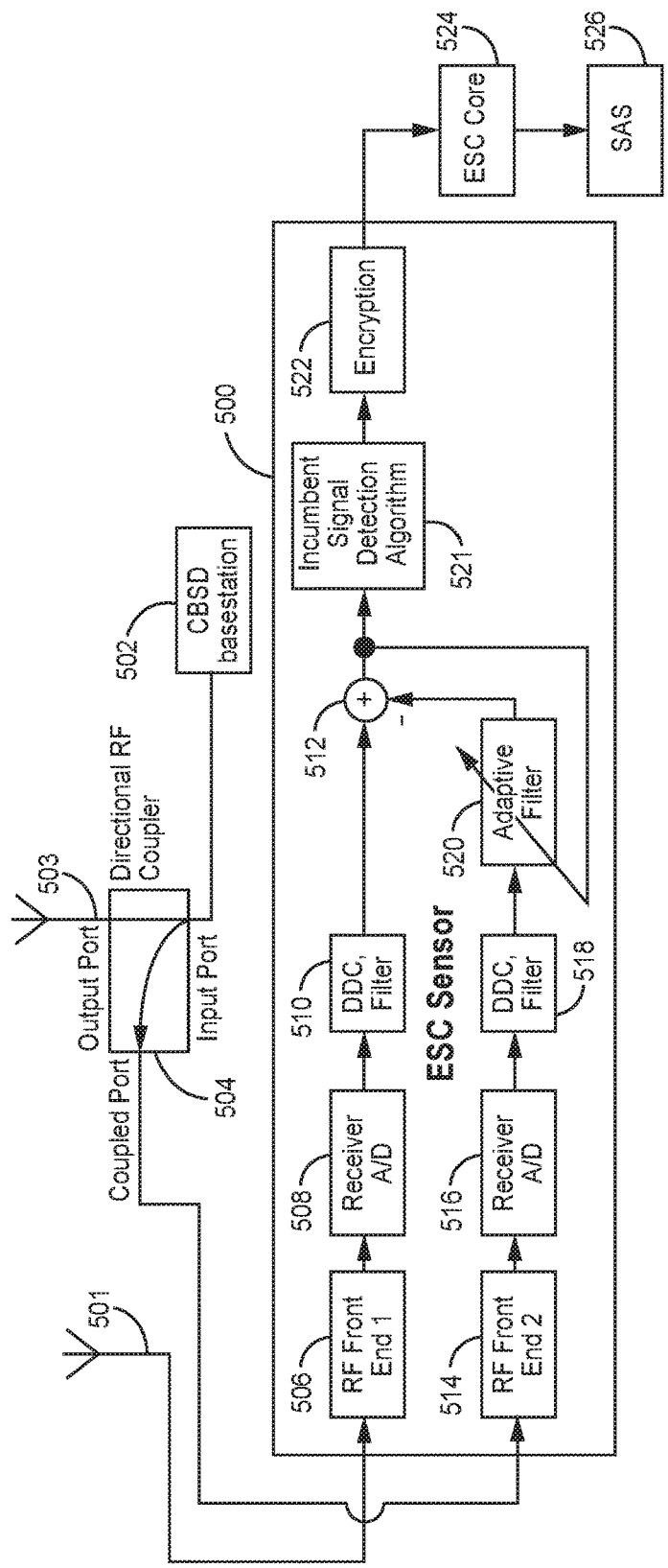
FIG. 5 is a block diagram of another embodiment of an environmental sensing capability (ESC) system for use in detecting signal consistent with an embodiment of the present invention.

In another embodiment, a directional coupler may be used to provide the sample signal of the second communication system (CBSD) for the signal cancellation path. Referring to FIG. 5, an example of an embodiment with a directional coupler 504 is illustrated. Similar to above discussed embodiment, an ESC sensor 500 of the first communication system and the CBSD base station 502 of the second communication system are collocated, thus placing the ESC antenna 501 and CBSD antenna 503 in close proximity to each other. For such cases, interference cancellation techniques can be implemented in the ESC sensor 500 in order to prevent the CBSD signal from masking the FIR signal received at the ESC antenna 501. FIG. 5 illustrates a technique by which the ESC sensor 500 adaptively subtracts from the IQ data that is received by the ESC antenna 501 similar to the embodiment of FIG. 4 with the addition of the directional coupler 504 and the use of an incumbent signal detection algorithm 521 (incumbent signal detector) discussed in detail below. The adaptive filter 520 can be LMS or Recursive Least-Squares (RLS) based algorithm as discussed above. See Paul S. Dinz (2013), Adaptive Filtering Algorithms and Practical Implementation, Fourth Revised Edition: Springer-Verlag New York Inc. for LMS and RLS) for examples.

In this embodiment, ESC sensor 500 includes a main signal path that receives signal from ESC antenna 501. This main or first signal path includes RF front end 506, Receiver A/D converter 508, digital down converter (DDC) and filter 510 and subtractor 512. This main path receives, digitizes, down-converts and filters the signals received at antenna 501.

ESC sensor 500 also includes a signal cancellation path (or second path) that processes a signal from a CBSD base station 502 of the second communication system so that any impact of that signal received at antenna 501 can be canceled out of the signal provided to the ESC core 524. In this embodiment, the directional RF coupler 504, coupled between the CBSD base station 502 and a CBSD antenna 503 provides an analog sampling of the CBSD output signal to the signal cancellation path. This signal cancellation path includes RF front end 514, receiver A/D converter 516, DDC and filter 518, and adaptive filter 520. The output of this signal path is fed into the negative port of subtractor 512. Adaptive filter 520 is adjusted based on the output of subtractor 512.

The output of subtractor 512, in this embodiment, is provided to the incumbent signal detection algorithm 521 of incumbent signal detector. The incumbent signal detection algorithm 521 detects the presence of signals from incumbent systems (the first communication system). An example of an incumbent signal detection algorithm, in an embodiment, is a cyclostationarity algorithm system described in detail below. An output of the incumbent signal detection algorithm is send to ESC core 524 via encryption 522. The output of the processing at ESC core 524 is sent to the SAS 526 for use in allocating bandwidth so as to not interfere with the incumbent services.

Cyclostationarity Detection

As discussed above, a cyclostationarity algorithm system may be implemented in the incumbent signal detection algorithm 521. When a radar signal is below a power threshold, cyclostationary methods are useful for detecting the presence or absence of a radar signal based on its unique cyclostationary properties. In addition to detecting the presence of the radar signal, there is an additional requirement for detecting the actual frequency of operation of the radar signal. The method of detecting the presence and estimating the frequency of FIR signals involves the use of sub-banding and cyclostationary detecting techniques for inferring the frequency. A frequency spectrum used by the first communication system is broken into as many smaller sub-bands as possible while keeping the sub-banding bandwidth more than the bandwidth of the signal that we are trying to detect. The cyclostationary properties of the generated sub-bands are then analyzed. The sub-band producing the best cyclostationary properties is selected and the frequency is determined.

Figure 6:
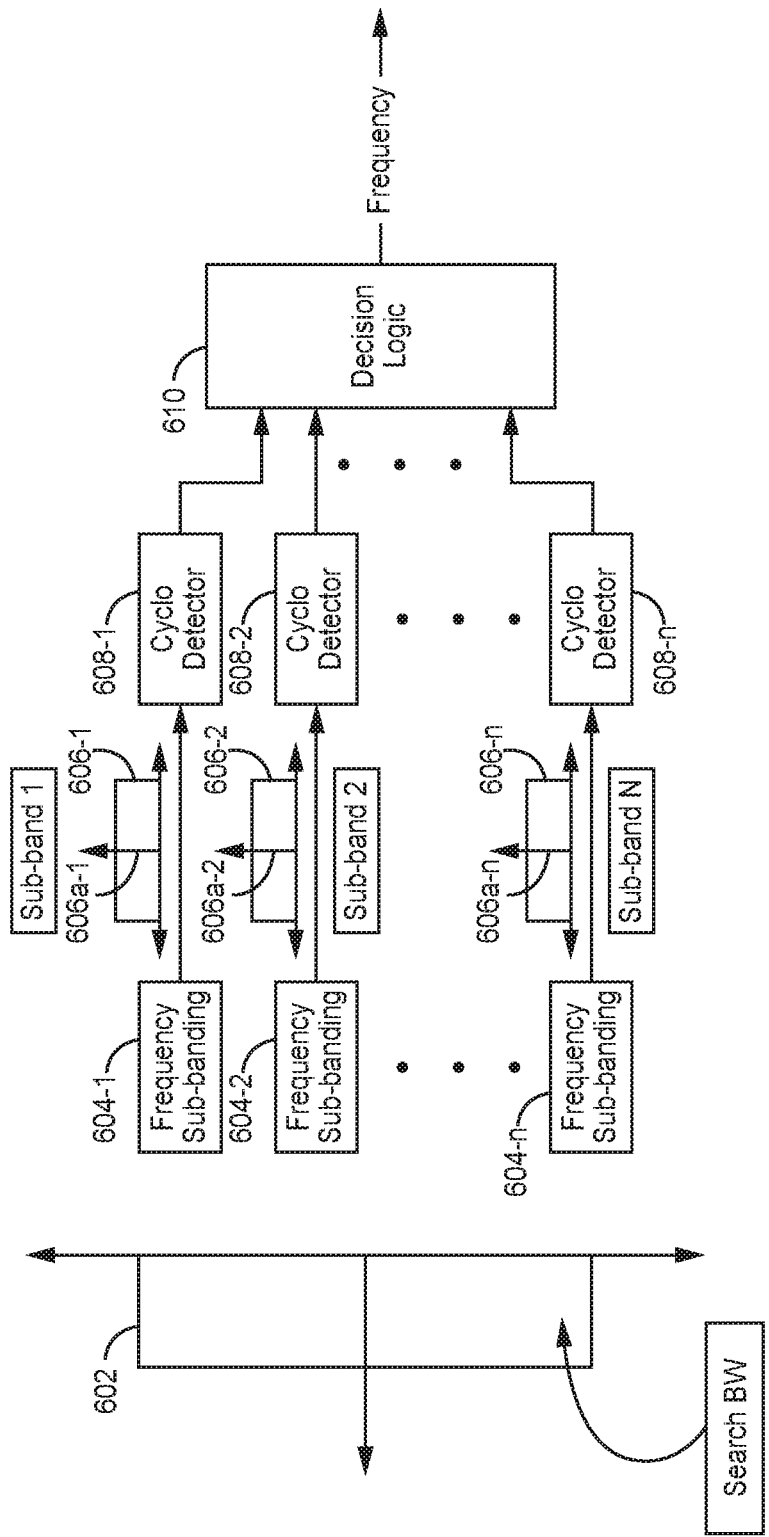
FIG. 6 is cyclostationary application of an incumbent signal detection algorithm of an embodiment of the present invention.

FIG. 6 illustrates an embodiment for detecting the presence or absence of a radar signal based on its unique cyclostationary properties. Cyclostationary properties vary cyclically with time. The process starts with the hypothesis that at least one radar signal occupies a portion of a bandwidth in a spectrum of frequency bandwidths 602. For example, the frequency of the entire bandwidth may be across an entire 150 MHz spectrum and the at least one radar signal may occupy a 1 MHz portion in that spectrum. In searching for the radar signal, the frequency of the entire bandwidth is divided up with frequency sub-banding 604-1 through 604-n. Example frequency sub-banding 604-1 through 604-n systems that can be used to divide the entire bandwidth spectrum 602 include, but are not limited to, filter bank systems and frequency shifting and low pass filtering cascade systems. Each sub-band 606-1 through 606-n is centered about a center point 606a-1 through 606a-n. Each sub-band 606-1 through 606-n is processed by a respective cyclo detector block 608-1 through 608-n. Each cyclo detector block 608-1 through 608-n, in an embodiment, runs a cyclostationary detection algorithm on the respective sub-bands 606-1 through 606-n. The cyclostationary detection algorithm identifies unique cyclo characteristics that generate a Cyclic Autocorrelation Function (CAF) for different delay values. An output of each of the cyclo detector blocks 608-1 through 608-n is provided to a decision logic 610. The decision logic 610 selects the sub-bands with the CAF metric crossing a certain threshold. The frequency of the detected signal is derived based on the position of the sub-band in the original signal bandwidth 602. Hence, use of the cyclostationary and subbanding system provides two functions. First it determines if a signal is present (if radar energy is present) and second, when a signal is present, the frequency of the Radar signal. See William A. Gardner (1991), Exploitation of Spectral Redundancy in Cyclostationary Signals: IEEE Signal Processing Magazine, vol. 8, April 1991, pp. 14-36 for CAF processes.

The foregoing description, including illustrated examples, has been presented only for the purpose of illustration and description and is not intended to be exhaustive or to limit the subject matter to the precise forms disclosed. Various modifications, adaptations, and uses thereof will be apparent to those skilled in the art without departing from this disclosure's scope. The illustrative examples described above are given to introduce the reader to the general subject matter discussed here and are not intended to limit the scope of the disclosed concepts.

What is claimed is:

1. A method for detecting the presence of a signal in a frequency spectrum, the method comprising:
    monitoring the frequency spectrum;
    estimating a power spectral density of the monitored frequency spectrum;
    segmenting a plurality of frequency bins for the frequency spectrum based on the estimated power spectral density;
    for segments with an estimated power spectral density above a first threshold, applying a radar spectral signal matching algorithm to detect the presence of the signal; and
    for segments with a power estimate below the first threshold and above a second threshold, applying additional techniques to detect the presence of the signal.

2. The method of claim 1, wherein applying additional techniques comprises:
    applying a cyclostationarity detection algorithm; and
    applying a wavelet transform.

3. The method of claim 1, wherein applying additional techniques comprises:
    performing wavelet decomposition and identifying nodes where wavelet decomposition coefficients match a radar pulse repetition pattern.

4. The method of claim 3, wherein a radar passband signal frequency is calculated from the identified wavelet nodes, where the wavelet decomposition coefficients match the radar pulse repetition pattern, and an applied translation frequency.

5. The method of claim 1, and further comprising flagging the presence of the signal when detected.

6. A system for detecting the presence of a signal in a frequency spectrum, the system comprising:
an environmental sensing capability (ESC) sensor configured to monitor the frequency spectrum and convert the spectrum into a digital data stream for transport;
an ESC core coupled to the ESC sensor over an encrypted backhaul communication link;
wherein the ESC core detects the presence of the signal in the frequency spectrum by:
estimating a power spectral density of the monitored frequency spectrum;
segmenting a plurality of frequency bins for the frequency spectrum based on the estimated power spectral density;
for segments with an estimated power spectral density above a first threshold, applying a radar spectral signal matching algorithm to detect the presence of the signal; and
for segments with a power estimate below the first threshold and above a second threshold, applying additional techniques to detect the presence of the signal.

7. The system of claim 6, wherein the ESC sensor includes a signal cancellation path to cancel the effect of any collocated Citizen Band Service Device (CBSD) base station.

8. The system of claim 6, wherein the ESC sensor implements compressive sampling or compression to reduce the data rate requirements of the encrypted backhaul communication link.

9. A system for detecting the presence of a signal in a frequency spectrum, the system comprising:
an environmental sensing capability (ESC) sensor configured to monitor the frequency spectrum and convert the spectrum into a digital data stream for transport;
an ESC core coupled to the ESC sensor;
wherein the ESC core detects the presence of the signal in the frequency spectrum by:
estimating a power spectral density of the monitored frequency spectrum;
segmenting a plurality of frequency bins for the frequency spectrum based on the estimated power spectral density;
for segments with an estimated power spectral density above a first threshold, applying a radar spectral signal matching algorithm to detect the presence of the signal; and
for segments with a power estimate below the first threshold and above a second threshold, applying additional techniques to detect the presence of the signal; and
an output of the ESC core configured to provide an indication of the presence of the signal in the spectrum to a spectrum access system (SAS) over a communication link.

10. A system for detecting the presence of a signal in a frequency spectrum, the system comprising:
an environmental sensing capability (ESC) sensor configured to monitor the frequency spectrum and convert the spectrum into a digital data stream for transport, wherein the ESC sensor is configured to
estimate a power spectral density of the monitored frequency spectrum; and
segment a plurality of frequency bins for the frequency spectrum based on the estimated power spectral density to identify segments that contain the signal;
an ESC core coupled to the ESC sensor over an encrypted backhaul communication link to receive the identified segments from the ESC sensor;
wherein the ESC core detects the presence of the signal in the frequency spectrum by:
for segments with an estimated power spectral density above a first threshold, applying a radar spectral signal matching algorithm to detect the presence of the signal; and
for segments with a power estimate below the first threshold and above a second threshold, applying additional techniques to detect the presence of the signal.

11. A system for detecting the presence of a signal in a frequency spectrum, the system comprising:
an environmental sensing capability (ESC) sensor, the ESC sensor including,
a main signal path including at least a main analog to digital converter to convert main communication analog signals from a first communication system into main communication digital signals,
a signal correction path coupled to receive a sample of second communication analog signals transmitted from a second communication system, the signal correction path including at least a correction analog to digital converter to convert the sample of the second communication analog signals to correction digital signals, and
a subtractor communicatively coupled to subtract the correction digital signals from the main communication digital signals;
a signal detector coupled to an output of the subtractor configured to determine the presence of signals from the first communication system; and
an ESC core communicatively coupled to the signal detector, the ESC core having signal processing functions and being configured to provide an output to a spectrum analysis system.

12. The system of claim 11, further comprising:
a splitter coupled to provide the sample of the second communication analog signals transmitted from the second communication system.

13. The system of claim 11, further comprising:
a directional coupler coupled to provide the sample of the second communication analog signals transmitted from the second communication system.

14. The system of claim 11, further comprising:
the main signal path including a main digital down converter and filter; and
the signal correction path in including a main digital down converter and filter.

15. The system of claim 11, further comprising:
the signal corrective path including an adaptive filter having an input coupled to an output of the subtractor.

16. The system of claim 11, wherein an incumbent signal detector is configured to implement a cyclostationary function to determine the presence of the second communication analog signals and the frequency of the second communication analog signals.

17. A method of processing first communication signals of a first communication system that is at least partially collocated with at least a part of a second communication system, the method comprising:
coupling received first communication signals of the first communication system to a main signal path;
coupling second sample communication signals generated by the second communication system to a signal correction path;

subtracting the second sample communication signals in the signal correction path from the first communication signals in the main signal path;

applying a signal detection algorithm that searches for a radar spectral signature of a signal corresponding to radar transmission characteristics to the output of the subtracting of the second sample communication signals from the first communication signals to at least in part determine the presence of a first communication signal; and wherein the signal detection algorithm is a cyclostationarity and wavelet detection algorithm that includes,
dividing an entire frequency spectrum used by the first communication system into a plurality of sub-bands,
applying the cyclostationarity detection algorithm to each of the sub-bands,
based on an output of each cyclostationarity detection algorithm, determining sub-bands having cyclic autocorrelation function with metrics crossing a certain threshold to determine a positive detection of signals from the first communication system in associated sub-bands, and
determining the frequency of the detected signals based at least in part on the position of the associated sub-bands in the plurality of sub-bands.

18. The method of claim 17, further comprising:
applying an adaptive filter to an output of the subtracting of the second sample communication signals from the first communication signals to adjust the signal correction path.

19. The method of claim 17, further comprising:
implementing a directional coupler coupled to a base station of the second communication system to generate the second sample communication signals.

20. The method of claim 17, further comprising:
converting the first communication signals in the main signal path into first digital signals;
filtering the first digital signals;
converting the second sample communication signals into second digital signals; and
filtering the second digital signals.

21. The method of claim 17, further comprising:
providing the output of the subtracting of the second sample communication signals from the first communication signals to a spectrum access system.

22. The method of claim 17, further comprising:
encrypting an output of the cyclostationarity detection algorithm.

23. A system for detecting the presence of a signal in a frequency spectrum, the system comprising:
an environmental sensing capability (ESC) sensor, the ESC sensor having signal processing functions being configured to provide an output to a spectrum analysis system and including,
a main signal path including at least a main analog to digital converter to convert main communication analog signals from a first communication system into main communication digital signals,
a signal correction path coupled to receive a sample of second communication analog signals transmitted from a second communication system, the signal correction path including at least a correction analog to digital converter to convert the sample of the second communication analog signals to correction digital signals,
a subtractor communicatively coupled to subtract the correction digital signals from the main communication digital signals, and
a signal detector coupled to an output of the subtractor configured to determine the presence of signals from the first communication system.

* * * * *